Patented Oct. 13, 1942

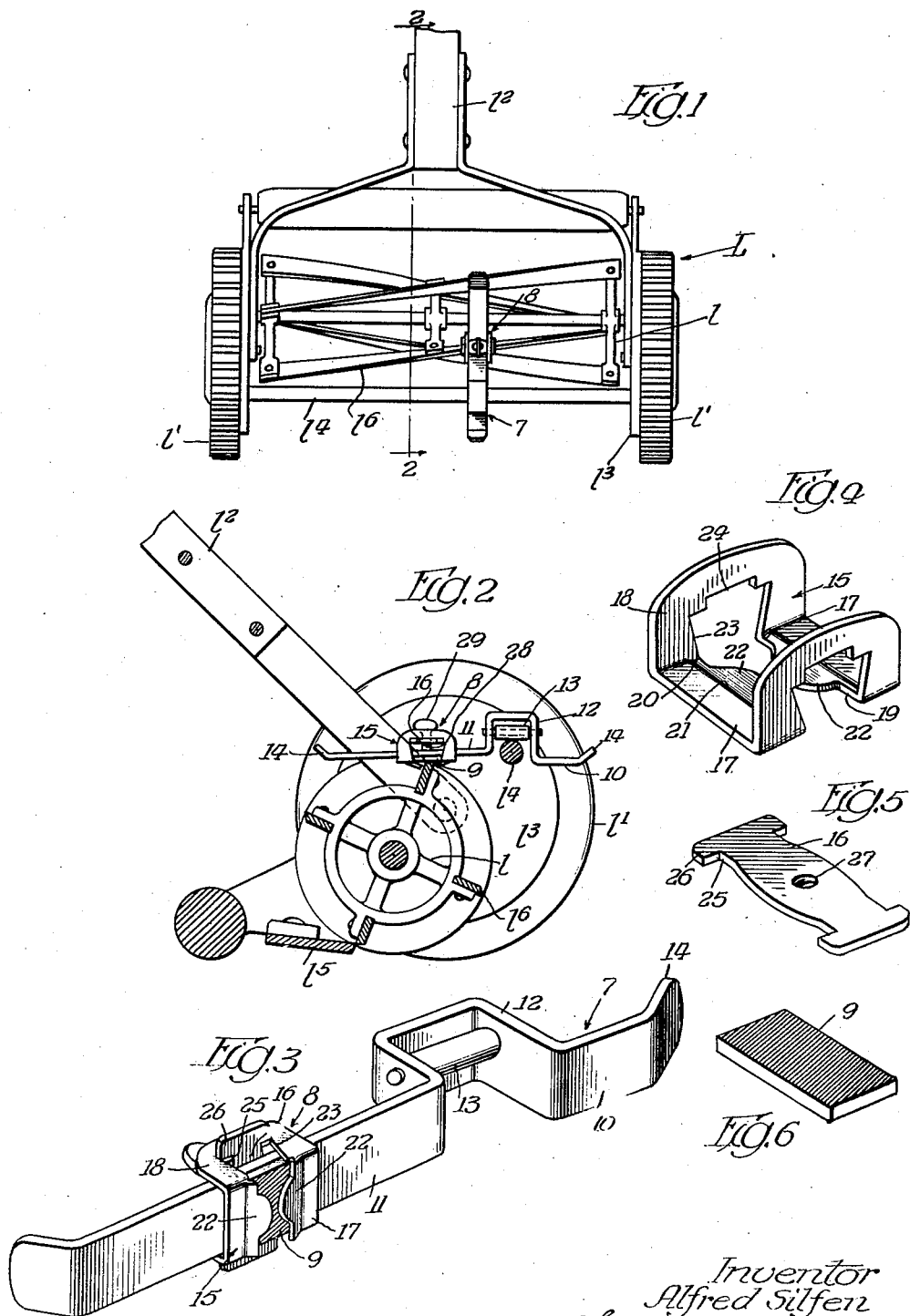

2,298,978

UNITED STATES PATENT OFFICE 2,298,978

LAWN MOWER SHARPENER

Alfred Silfen, Berkeley, Ill.

Application May 26, 1941, Serial No. 395,193

4 Claims. (Cl. 76—82.1)

The present invention relates generally to sharpeners for lawn mowers. More particularly the invention relates to that type of lawn mower sharpener which comprises a metallic bar with a U-shaped guide at one end thereof and a longitudinally adjustable file retaining bracket at its other end, and is used by first manipulating the bar in such manner as to bring it into a transverse position with respect to the blade equipped rotor of the lawn mower to be sharpened and at the same time to bring the U-shaped guide into straddled relation with the tie rod between the gear housings of the mower and the file into abutment or contacting relation with one of the spiral blades of the rotor, and then grasping the ends of the bar and shifting the bar back and forth between the wheels of the lawn mower in order to cause the file to move lengthwise of the one blade and sharpen the latter.

One object of the invention is to provide a lawn mower sharpener of this type which is an improvement upon, and has certain advantages over, previously designed sharpeners of the same general character, including that which is shown in, and forms the subject matter of, an application for United States Letters Patent filed by me on March 10, 1941, Serial No. 382,508.

Another object of the invention is to provide a lawn mower sharpener of the type under consideration in which the file retaining bracket is of new and improved design and is so constructed that when it is in assembled and locked relation with the bar the file is effectively and efficiently locked against longitudinal or transverse movement with respect to the bar.

A further object of the invention is to provide a lawn mower sharpener of the last mentioned character in which the bracket consists of a U-shaped clip in straddled relation with the bar and in addition a screw carrying cross piece over the bar and in interlocked relation with the side legs of the clip and embodies novel means at the sides of the file for receiving the blade to be sharpened and causing the blade in connection with reciprocation or back and forth movement of the bar between the lawn mower wheels to rotate first backwards and then forwards.

A still further object of the invention is to provide a lawn mower sharpener which is both practical and durable and in which facility of adjustment is combined with simplicity of design or construction.

Other objects of the invention and the various advantages and characteristics of the present lawn mower sharpener will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like letters and numerals of reference denote corresponding parts throughout the several views:

Figure 1 is a plan view of a lawn mower having applied thereto a sharpener embodying the invention;

Figure 2 is a vertical transverse section taken on the line 2—2 of Figure 1 and showing the sharpener in its operative or blade sharpening position;

Figure 3 is a perspective view of the sharpener illustrating the construction of the bar and showing in detail the arrangement and design of the file retaining bracket;

Figure 4 is a perspective view of the U-shaped clip of the bracket;

Figure 5 is a perspective view of the screw carrying cross piece of the bracket; and Figure 6 is a perspective of the file.

The sharpener which is shown or illustrated in the drawing constitutes the preferred embodiment of the invention. It is illustrated in connection with a conventional or standard lawn mower L and serves, as hereinafter described, as a medium for sharpening the blades of the lawn mower. The lawn mower L comprises a horizontally extending rotor 1, a pair of ground wheels $1^1$ at the ends of the rotor, and a handle $1^2$. Gearing (not shown) in housings $1^3$ serves to drive the rotor from the wheels during forward movement or travel of the lawn mower. In addition to the aforementioned parts the lawn mower comprises a tie rod $1^4$ between the gear housings $1^3$ and a fixed horizontally extending knife bar $1^5$. The rotor is provided with a plurality of equidistantly spaced spiral blades $1^6$ and these, as well understood in the art, are adapted or designed in connection with forward travel of the lawn mower successively to traverse the knife bar $1^5$ and effect the desired cutting of the grass. The knife bar is located at the bottom of the lawn mower and the tie rod $1^4$ is located above and slightly forwards of the blade equipped rotor.

As its parts the sharpener comprises a one-piece metallic bar 7 and a longitudinally adjustable bracket 8 on one end of the bar. As hereinafter described the bracket serves as a retainer for a file 9.

The bar 7 is formed of flat metal stock and is adapted in connection with use of the sharpener to be placed in a transverse position over the lawn mower rotor, as shown in Figures 1 and 2. It consists of a straight short end part 10, a straight long end part 11 and a U-shaped guide 12 between the two end parts. The guide is formed by striking upwards or otherwise shaping the portion of the bar that is directly inwards of the short end part 10 and serves as a medium for connecting the two end parts 10 and 11. It is adapted in connection with use of the sharpener to straddle and slide lengthwise of the tie rod 14 of the lawn mower L and has a pin supported roller 13 beneath the cross piece thereof. When the sharpener is in use the roller 13 rides upon the upper portion of the tie rod 14 and thus permits the guide to travel freely along the tie rod. The outer extremities 10 and 11 of the bar are bent upwards to form handles 14 whereby the bar may be gripped between the thumb and forefingers when it is shifted back and forth for blade sharpening purposes.

The bracket 8 surrounds and is slidable lengthwise of the straight long end part 11 of the bar 7. It serves in addition to holding or retaining the file 9 to guide the blade to be sharpened with respect to the file and comprises a U-shaped clip 15 and a cross piece 16. The clip 15 is in the form of a one-piece sheet metal stamping and is arranged in straddled relation with the long end part 11 of the bar 7, as shown in Figures 2 and 3. It serves as the file retaining instrumentality of the bracket 8 and consists of a cross leg 17 and a pair of upstanding side legs 18. The cross leg extends between and serves to connect the two side legs. It fits slidably against the bottom face of the straight long end part 11 of the bar 7 when the bracket is in assembled relation with the bar and has a central slot 19. This slot extends transversely of the bar end part 11 and is parallel to the side edges of the cross leg 17. It is adapted to receive the edge of the blade to be sharpened, as shown in Figure 2. Its ends terminate at the junctures of the cross leg and the side legs. The portions of the cross leg which define the sides of the slot are pressed or struck downwards to form a pair of shallow oppositely facing seats 20 which serve as supporting means for the side margins of the file 9 and have shoulders 21 along their outer side portions. They are also shaped to form a pair of semicircular opposed guide lugs 22. When in assembled relation with the bracket the file 9 overlies the slot 19 in the central portion of the cross leg 17 of the clip 15 and rests upon, and is supported by, the seats 20. The width of the file corresponds to the distance between the two shoulders 21 with the result that the side edges of the file abut against the shoulders 21 and coact therewith to hold the file against lateral displacement with respect to the clip 15. The guide lugs 22 are adapted to straddle the blade to be sharpened, as illustrated in Figure 2. They have a twofold purpose in that they serve, first, to hold the blade to be sharpened in abutment with the bottom face of the file 9 when the sharpener is used and, secondly, to cause the blade to be sharpened in connection with reciprocation or back and forth movement of the bar between the lawn mower wheels to rotate or swing first backwards and then forwards. By reason of the fact that the guide lugs 22 are semicircular they slide readily against the side faces of the blade to be sharpened during a sharpening operation. As shown in Figure 2 the guide lugs are downwardly inclined to a slight extent. As a result of this they are in spaced relation with respect to the bottom face of the file 9 and there is no likelihood of the blade to be sharpened becoming bound between them in connection with back and forth shift or reciprocation of the bar 7.

The side legs 18 of the U-shaped clip 15 extend upwards at right angles to the cross leg 17. They lap and slidably engage the side edges of the straight long end part 11 of the bar 7 and have central wedge shaped openings 23. Preferably there is but a minimum amount of clearance between the side legs 18 and the side edges of the bar end part 11 and as a result when the bracket is in assembled relation with the bar the side legs hold the bracket against tilting movement with respect to the end part 11. The openings 23 in the central portions of the side legs are so designed or shaped that the small ends thereof are at the bottom and join and communicate with the ends of the central notch 19 in the cross leg 17. The portions of the side legs 18 which define the upper or large ends of the openings 23 have downwardly facing notches 24. These notches are of materially less width than the upper ends of the openings 23 and join and communicate with the upper ends of said openings. The lower inner corner portions of the side legs 18, that is, the portions which define the lower ends of the wedge shaped openings 23, extend across the ends of the seats 20 and engage the corners of the file 9 in such manner that the file is held against longitudinal displacement with respect to the U-shaped clip 15.

The cross piece 16 of the bracket 8 is longer than the clip 15. It is in the form of a one-piece sheet metal stamping and is flat sided. As shown in Figures 2 and 3 the cross piece 16 extends across the top face of the straight long end part 11 of the bar 7 when the bracket 8 is in assembled relation with the bar. The ends of the cross piece are adapted to project through the central wedge shaped openings 23 in the side legs 18 and are shaped to form narrow necks 25 and enlarged heads 26 outwards of the necks. The necks 25 correspond in width to, and are shaped to fit within, the notches 24 at the upper ends of the openings 23. The heads 26 constituting the outer extremities of the cross piece 16, lap the outer faces of the side legs 18 when the cross piece is in assembled relation with the clip and serve to prevent longitudinal displacement of the cross piece with respect to the clip. The central portion of the cross piece is provided with a vertical or transverse internally threaded hole 27 for a clamp screw 28. The inner or lower end of the screw is adapted to abut against the top face of the straight long end part 11 of the bar 7 and the outer end of the screw is provided with a flattened head 29 in order that the screw may be readily turned. When the screw is tightened while the bracket is in assembled relation with the bar end part 11 it urges the cross piece 16 upwards with respect to said end part and this movement on the part of the cross piece draws the U-shaped clip 15 upwards and clamps the file tightly against the bottom face of the bar end part 11. When the screw is loosened the bracket may be slid or adjusted longitudinally of the end part 11 and the sharpener as a whole thus adjusted for use in connection with different sized lawn mowers.

In assembling the bracket 8 the file 9 is first placed over the central portion of the cross leg 17 of the U-shaped clip 15 and is then urged or pressed downwards into seated relation with the seats 20. Thereafter the clip is manipulated into straddled relation with the straight long end part 11 of the bar 7. After the latter operation the cross piece 16 is placed over the top face of the end part 11 and is manipulated so as to bring the ends thereof into interfitting relation with the notches 24 in the upper central portions of said legs 18 of the clip. At the conclusion of this operation the screw 28 is tightened so as to clamp the bracket to the long end part 11 of the bar. In using the sharpener the bar 7 is manipulated so as to bring the U-shaped guide 12 into straddled relation with the tie rod 14. After proper positioning or manipulation of the guide the bracket 8 is adjusted and then manipulated so as to bring the blade to be sharpened between the guide lugs 22 and into abutment with the bottom face of the file 9. When the sharpener is properly positioned the handles 14 at the outer extremities of the bar 7 are grasped and the bar is shifted back and forth between the wheels of the lawn mower L. During such movement of the bar the file 9 engages and slides along the edge of the blade to be sharpened and effects the desired sharpening. After sharpening of one blade of the rotor the sharpener is used to sharpen the other blades. If it should be necessary to change the file due to wear the screw 28 is loosened so as to release the bracket 8. After release of the bracket the cross piece 16 is removed from the clip so as to free the latter and permit the file to be removed from seated relation with the seats 20.

The herein described lawn mower sharpener consists of but a small number of parts and hence may be manufactured at a low and reasonable cost. It is durable or rugged and is characterized by the fact that the construction and design of the bracket 8 are such that the sharpener as a whole is extremely efficient in operation and may be used with facility.

The invention is not to be understood as restricted to the details set forth since these may be modified within the scope of the appended claims without departing from the spirit and scope of the invention.

Having thus described the invention what I claim as new and desire to secure by Letters Patent is:

1. A bracket and file assembly adapted to form a part of a lawn mower sharpener of the bar type and comprising a bracket slidably mounted on one end of the bar and consisting of a U-shaped clip embodying a cross leg fitting against the bottom face of said one end of the bar and having a lawn mower blade receiving guide slot in its central portion and the portions thereof that define the sides of the slot depressed to form a pair of opposed seats above the slot, and also embodying a pair of upstanding side legs projecting upwardly from the ends of the cross leg and above the side edges of said one end of the bar and having opposed openings in the central portions thereof, and a cross piece over said one end of the bar having its ends extending through the openings in said side legs of the clip, and provided at its central portion with bar engaging means for urging it and the clip upwards relatively to said other end of the bar, and an elongated blade sharpening file over the guide slot, extending transversely across the bottom face of said one end of the bar and having the side margins thereof fitting snugly within the seats.

2. A bracket and file assembly adapted to form a part of a lawn mower sharpener of the bar type and comprising a bracket slidably mounted on one end of the bar and consisting of a U-shaped stamped metal clip embodying a cross leg fitting against the bottom face of said one end of the bar and having a lawn mower blade receiving longitudinally extending guide slot in its central portion and the narrow marginal portions thereof that define the sides of the slot depressed to form a pair of opposed seats above the slot and with shoulders at the sides thereof and also shaped to form a pair of inwardly extending opposed substantially semicircular blade receiving guide lugs, and also embodying a pair of upstanding side legs projecting upwardly from the ends of the cross leg and above the side edges of said one end of the bar and having opposed openings in the central portions thereof, and a cross piece over said one end of the bar having its ends extending through the openings in said side legs of the clip, and provided at its central portion with bar engaging means for urging it and the clip upwards relatively to said one end of the bar, and an elongated blade sharpening file over the guide slot, extending transversely across the bottom face of said one end of the bar and having the side margins thereof fitting snugly within the seats and against said shoulders.

3. A bracket and file assembly adapted to form a part of a lawn mower sharpener of the bar type and comprising a bracket slidably mounted on one end of the bar and consisting of a U-shaped stamped metal clip embodying a cross leg fitting against the bottom face of said one end of the bar and having a longitudinal lawn mower blade receiving guide slot in its central portion and the marginal portions thereof that define the sides of the slot depressed to form a pair of opposed seats above the slot with shoulders at the sides thereof and shaped to form a pair of inwardly extending downwardly inclined blade engaging guide lugs beneath and inwardly of the seats, and also embodying a pair of upstanding side legs projecting upwardly from the ends of the cross leg and above the side edges of said one end of the bar and having opposed openings in the central portions thereof, and a stamped metal cross piece over said one end of the bar having head equipped ends extending through the openings in, and interlocked with, said side legs of the clip and provided at its central portion with bar engaging means for urging it and the clip upwards relatively to said one end of the bar, and an elongated blade sharpening file over the guide slot, extending transversely across the bottom face of said one end of the bar and having the side margins thereof fitting snugly within the seats and against said shoulders.

4. A bracket and file assembly adapted to form a part of a lawn mower sharpener of the bar type and comprising a bracket slidably mounted on one end of the bar and consisting of a U-shaped clip embodying a cross leg fitting across the bottom face of said one end of the bar and having a longitudinal lawn mower blade receiving guide slot in its central portion, and also embodying a pair of upstanding side legs fitting against and projecting above the side edges of said one end of the bar and having in the central portions thereof opposed openings together with short notches at the upper ends of the openings, and a cross piece over said one end of the bar provided at its ends with narrow necks and laterally elongated heads beyond the necks and having said necks fitting within the notches and the heads in abutment with the outer faces of said side legs of the clip, and also provided at its central portion with bar engaging means for urging it and the clip upwards relatively to said one end of the bar, and a blade sharpening file extending over said slot and fitting between the cross leg of the clip and the bottom face of said one end of the bar.

ALFRED SILFEN.